United States Patent [19]

Sampey

[11] Patent Number: 4,612,025
[45] Date of Patent: Sep. 16, 1986

[54] PAINT SPRAY BOOTH CLEANING APPARATUS

[75] Inventor: Ronald W. Sampey, Fowlerville, Mich.

[73] Assignee: Tri-Mark Metal Corporation, Detroit, Mich.

[21] Appl. No.: 717,670

[22] Filed: Mar. 29, 1985

[51] Int. Cl.⁴ ............................................. B01D 47/10
[52] U.S. Cl. ................................ 55/223; 55/257 NP; 55/241; 98/115.2
[58] Field of Search .................. 55/223, 257 NP, 241; 98/115.2

[56] References Cited

U.S. PATENT DOCUMENTS

| | | | |
|---|---|---|---|
| 3,170,007 | 2/1965 | Krantz | 55/241 |
| 3,347,024 | 10/1967 | Dock et al. | 55/241 |
| 3,524,631 | 8/1970 | Mare | 55/241 |
| 3,803,997 | 4/1974 | Van Raden | 98/115.2 |
| 4,257,784 | 3/1981 | Gebhard et al. | 98/115.2 |
| 4,345,921 | 8/1982 | Gustavsson et al. | 98/115.2 |
| 4,350,506 | 9/1982 | Otto | 55/241 |
| 4,440,554 | 4/1984 | Perry | 98/115.2 |

Primary Examiner—Tim Miles
Attorney, Agent, or Firm—Barnes, Kisselle, Raisch, Choate, Whittemore & Hulbert

[57] ABSTRACT

An apparatus for cleaning the air from a paint spray booth by removing paint particles entrained therein in which water flows across downwardly converging bottoms walls of the booth through a nozzle extending substantially the entire length of the booth to prevent paint from adhering to them. To improve efficiency and insure the water prevents adherence of paint particles, the nozzle has a rounded entry. The water is atomized and mixed with the paint particles in a restricted section of the nozzle which is connected to the entry by ledges which direct the water across the inlet of the restricted section to improve atomization and mixing of the water and to minimize the noise produced by the operation of the nozzle. The mixture is discharged from this nozzle through a restricted orifice at a high velocity to impinge on a pool of water below the nozzle which separates and removes particles of paint from the air.

20 Claims, 5 Drawing Figures

PAINT SPRAY BOOTH CLEANING APPARATUS

FIELD OF THE INVENTION

This invention relates to paint spray booths and more particularly to cleaning air from the spray booth having particles of paint entrained therein.

BACKGROUND OF THE INVENTION

Booths in which paint is sprayed on articles such as automobiles, appliances and the like are old and well-known. To improve the quality of the painting of the articles and to protect equipment and the health and safety of operators or other persons in the booth, a stream of air is circulated through the booth to pick up and remove atomized paint particles which do not adhere to the articles being painted. Before this air can be discharged to the atmosphere or recirculated through the booth, it is necessary to clean it by removing the particles of paint entrained therein.

Many methods and devices have been previously developed for cleaning the air by removing a portion of the particles of paint from it. These devices are complicated, expensive, noisy, relatively large and usually do not remove a sufficient quantity of paint particles from the air to meet the clean air requirements of many industries. For example, the automotive industry requires extremely clean air having not more than 3.0 grains of paint particles per 1,000 dry standard cubic feet (DSCF) of air.

SUMMARY OF THE INVENTION

Air cleaning apparatus for a paint spray booth in which water flows across downwardly converging bottom walls to prevent particles from adhering to the walls and through a nozzle extending substantially the entire length of the booth along with air having paint particles entrained therein from the paint application chamber of the booth. The nozzle has a rounded entry with side walls over which the water flows to prevent any particles adhering thereto and a restricted portion in which atomized particles of water are mixed with the air and paint particles to provide a scrubbing or cleaning action. The mixture is discharged from a restricted orifice at a high velocity to impinge on a pool of water below the nozzle to separate and remove the paint particles. To improve atomization of the water and decrease the noise produced by the operating nozzle, the water impinges on ledges adjacent the inlet to the restricted section so that the water is directed generally across the inlet.

Preferably, the nozzle and pool of water are enclosed by a lower chamber through which the stream of air is drawn by an exhaust fan. Preferably, water from the pool with paint particles therein flows out of the lower chamber and subsequently the particles are removed from the water. Preferably, baffles are disposed in the lower chamber downstream from the pool to remove particles of water from the clean air before it is exhausted from the lower chamber.

Objects, features and advantages of this invention are to provide a spray booth air cleaning apparatus which produces extremely clean air, has essentially no build-up of sludge or paint particles, facilitates removal and collection of separated particles of paint, is relatively compact, rugged, durable and of simplified design, manufacture and assembly, and in operation is very effective, efficient, quiet and relatively service and maintenance-free.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
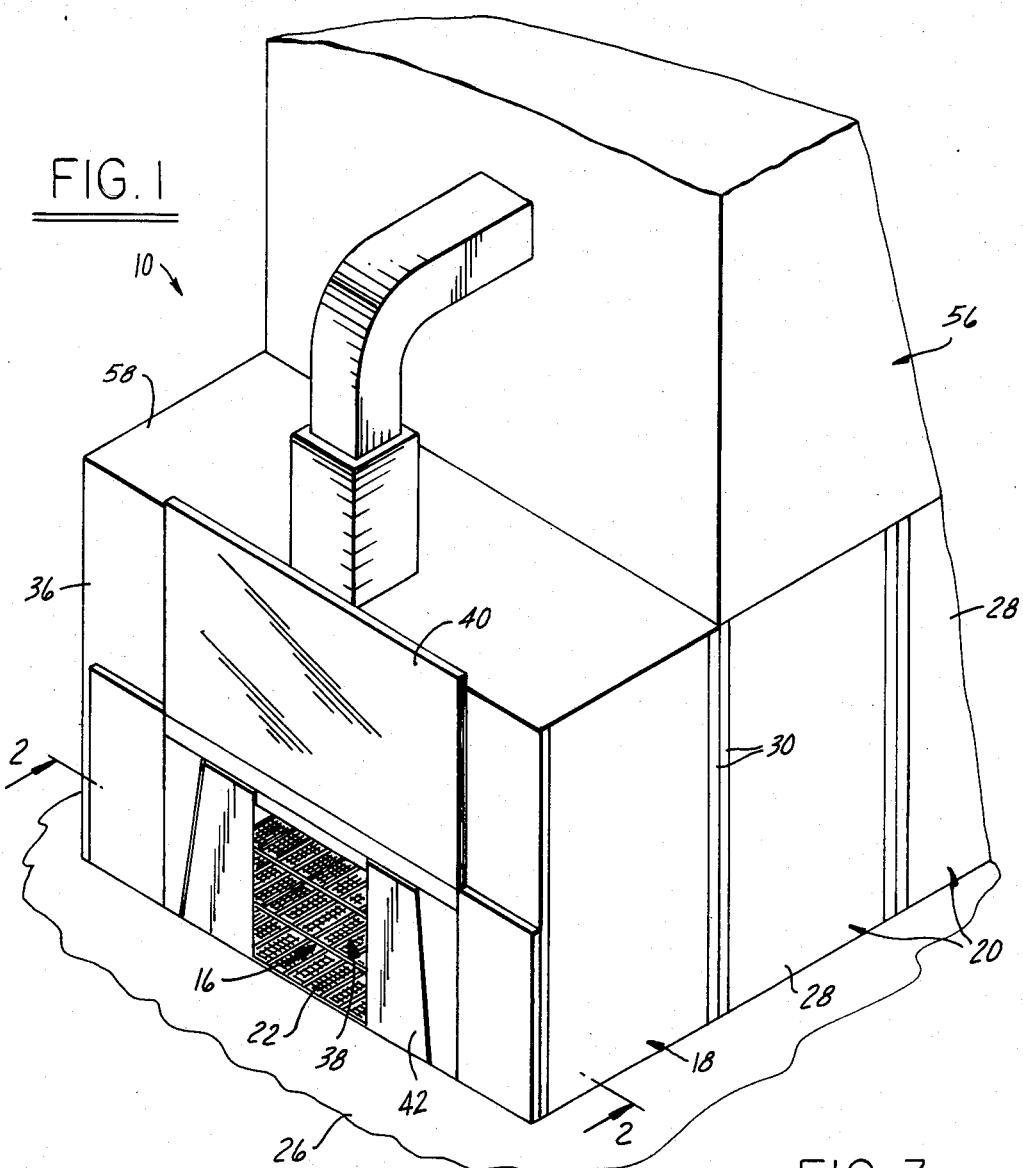
FIG. 1 is a fragmentary perspective view of a paint spray booth embodying this invention.
Figure 2:
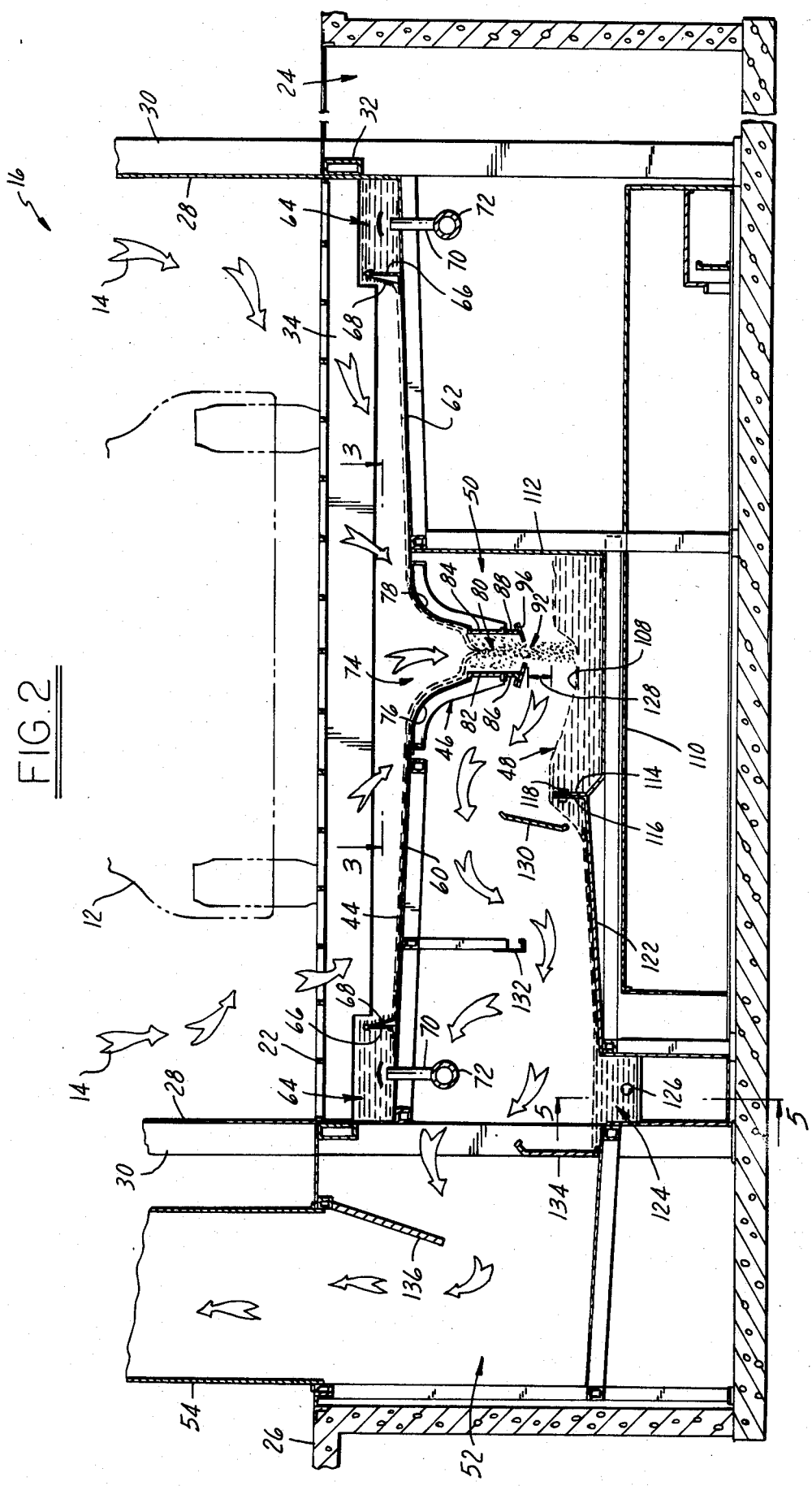
FIG. 2 is a fragmentary sectional view taken generally on line 2—2 of FIG. 1 illustrating the bottom walls, nozzle, water pool and lower chamber of the cleaning apparatus of the spray booth of FIG. 1.

Referring in more detail to the drawings, FIGS. 1 and 2 illustrate a spray booth 10 embodying this invention for use in spraying primer and paint on the bodies of automobiles 12 during manufacture of the automobiles. The primer or paint can be sprayed from a variety of paint spray guns (not shown) which in use result in atomized particles of paint being entrained in a stream of air indicated by the arrows 14, flowing generally downwardly through the working or paint application chamber 16 of the booth in which the automobile is received while being sprayed. The spray gun may be positioned, manipulated and operated by operating personnel and/or a robot or other device in the application chamber.

Preferably, although not necessarily, the spray booth is of modular construction with a pair of end modules 18 and one or more intermediate modules 20 which can be prefabricated in a manufacturing plant and then shipped to the job site where they are assembled together and installed. Typically, the spray booth is 15 to 20 feet wide, 40 to 200 feet long and 20 to 30 feet high. As shown in FIG. 2, the spray booth usually has a horizontal surface of open grates 22 through which the air stream passes and is installed in a pit 24 so that the grates are flush with the floor 26 of the plant. Each module has side walls 28 defining the working chamber which are fixed to upstanding corner support columns 30 interconnected by horizontal side beams 32. The grates are received on cross beams 34 fixed to the side beams or supports. The end modules also have end walls 36 fixed to the columns and having entrance and exit openings 38 which can be at least partially closed by doors 40 and/or curtains 42.

In accordance with this invention, air with entrained paint particles from the application chamber 16 along with water 44 flows into a nozzle 46 where they are mixed and then discharged into a pool of water 48 to separate and remove the paint particles from the air. Preferably, the nozzle and pool of water extend substantially the full length of the booth. The nozzle and pool of water are enclosed in a sealed lower chamber 50 from which the cleaned air exits through an output 52 connected to a duct 54. The air stream 14 enters the booth 10 through a large plenum 56 which overlies most of the top 58 of the booth and is drawn down through the application chamber, nozzle, lower chamber, outlet, and discharge duct by a fan system (not shown), having a large capacity fan or fans which produce an exhaust rate for the spray booth in the range of about 1,000 to 2,000 dry standard cubic feet per minute (DSCFM) per lineal foot of the length of the spray booth. Typically, the exhaust fan inlet has a static pressure usually in the range of about 4 to 10, desirably 5 to 8 and preferably 5 to 7 inches of water in a conventional water column.

Figure 3:
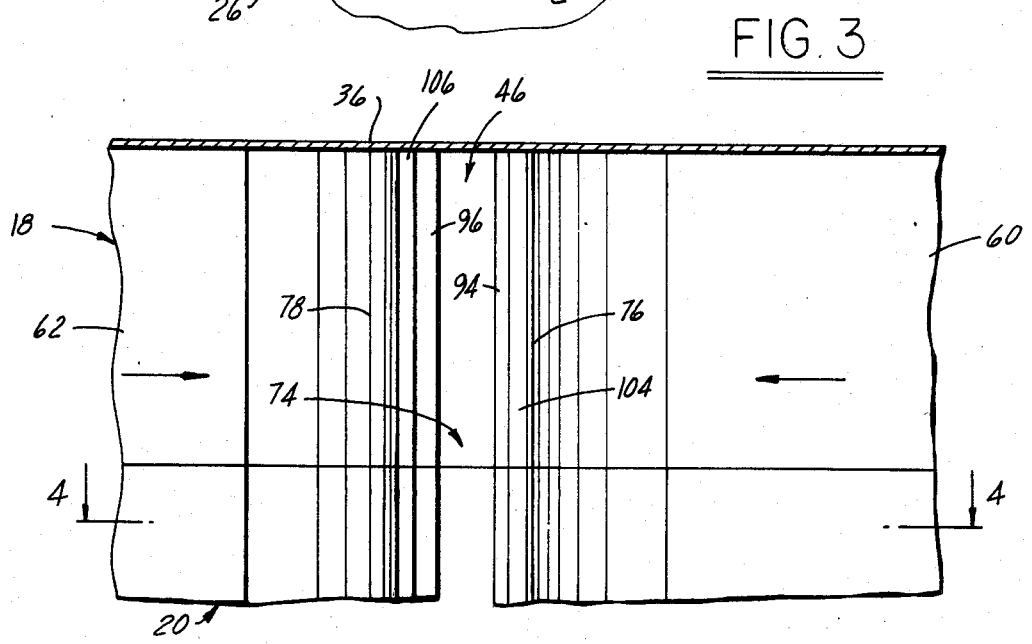
FIG. 3 is a fragmentary sectional view taken generally on line 3—3 of FIG. 2 and showing a top view of the nozzle.

As shown in FIGS. 2 and 3, the water flows over bottom walls 60 and 62 which extend across substantially the entire width and length of the application chamber of the spray booth and converge downwardly into the nozzle. Along the outer edges of the bottom walls, water troughs 64 extend at least substantially the full length of the spray booth. Each water trough is formed by an upstanding side plate 66 fixed and sealed to its associated bottom wall and extending the full length of the booth. To insure that the water flows from the troughs onto the bottom walls smoothly, an inclined slide plate 68 is connected to the top of the plate 66 and its associated bottom wall. Water is supplied to each trough through a plurality of longitudinally spaced outlets 70 each connected to a manifold 72.

In operation, the troughs provide a smooth and continuous flow of water across the entire surface of the bottom walls so that particles of paint cannot adhere to them. A sheet of water flowing over the bottom wall typically has a nominal thickness in the range of about $\frac{1}{4}$ to $\frac{3}{4}$ of an inch, desirably about $\frac{3}{8}$ to $\frac{5}{8}$ of an inch, and preferably about $\frac{1}{2}$ of an inch. This is achieved with a total water flow rate into the troughs in the range of about 25 to 75, desirably 40 to 60, and preferably about 50 gallons per minute per lineal foot of length of the bottom walls or nozzle. To insure proper flow of water across the bottom walls and into the nozzle, the bottom walls converge downwardly toward the nozzle at an acute included angle to the horizon or a horizontal reference of about 1° to 5°, and preferably about 2° to 3°.

In accordance with another feature of this invention, to increase efficiency and prevent paint particles from adhering to the nozzle 30, it has a rounded entry 74 provided by curved side wall portions 76 and 78. The rounded entry insures that the water flows over and covers all the outer surface area of the side wall portions 76 and 78 to prevent particles of paint from adhering to the side walls. The rounded entry is believed to also improve efficiency by greatly decreasing the power required to drive the exhaust fan to achieve the desired rates of flow of the air stream through various sections of the nozzle.

The rounded entry usually has a maximum width at its inlet of about 42 to 54 inches, desirably 45 to 51 inches, and preferably about 48 inches and a width at its outlet of about 10 to 18 inches, desirably about 12 to 16 inches, and preferably about 14 inches. The depth or vertical height of the inlet is usually in the range of 10 to 20 inches, desirably about 12 to 18 inches, and preferably about 15 inches. Preferably, each side wall has a lower straight section inclined at an acute included angle to the vertical in the range of about 10° to 20°, and preferably about 15° which blends into an upper curved portion having a radius usually in the range of about 9 to 15 inches, desirably 10 to 14 inches, and preferably about 12 inches.

Figure 4:
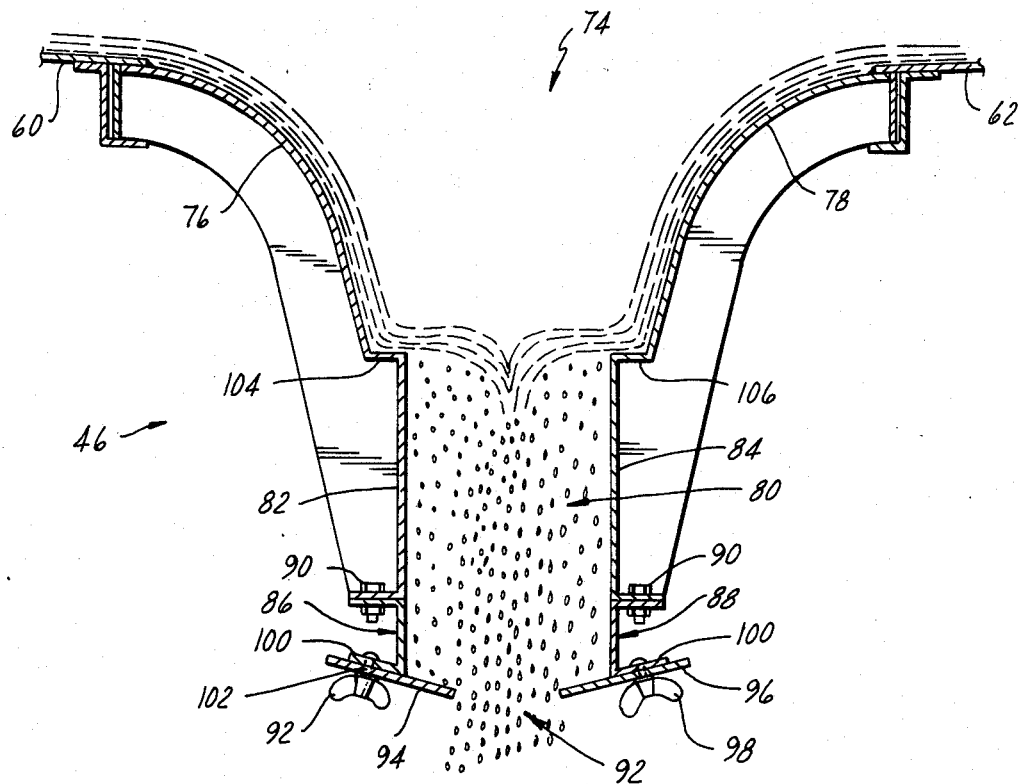
FIG. 4 is an enlarged fragmentary sectional view of the nozzle taken generally on line 4—4 of FIG. 3.

To atomize the water or disperse it in small particles, to mix the water particles with the air stream and to provide a scrubbing action attaching the paint particles to the water particles, the nozzle has a restricted section 80 formed by two flat wall portions 82 and 84 and coplanar extension walls 86 and 88 releasably secured thereto by bolts 90 (FIG. 4). By using extension walls 86 and 88 of different depths or vertical heights, the depth or vertical height of the restricted section 80 of the nozzle can be varied without constructing an entire new nozzle. Increasing the depth of the restricted section is believed to improve atomization and mixing of the water and to decrease the noise produced by the nozzle when in use. The depth of this restricted section is usually about 9 inches to 24 inches, desirably about 11 to 20 inches and preferably about 13 inches. The width of this restricted section is usually in the range of about 8 to 12 inches, desirably 9 to 11 inches, and preferably about 10 inches.

The mixture is discharged from the nozzle directly into the pool of water 48 to separate and remove the paint particles from the air stream. The mixture is discharged through an orifice 92 formed by restrictor plates 94 and 96 secured by bolts and nuts 98 to flanges 100 on the extension walls 86 and 88. To enable the width of the orifice 92 to be adjusted, the plates have elongate slots 102 through which the bolts extend. To increase the velocity at which the mixture is discharged into the water pool, the orifice 92 is restricted relative to the mixing section 80. The width of the orifice 92 is usually in the range of about 4 to 8 inches, desirably 5 to 7 inches, and preferably about 6 inches.

In accordance with another feature of this invention, to suppress or minimize the noise produced by the operating nozzle and to enhance atomization and mixing of the water particles, the rounded entry 74 and restricted section 80 are interconnected by ledges or flat plates 104 and 106 which extend generally transversely to the side walls of the restricted section. The ledge plates provide an abrupt change in the direction of water flow so that opposed streams of water extend generally laterally across the entrance of the restricted section and merge in the middle thereof as shown in FIG. 4. The width of each ledge is usually in the range of about 1 to 3 inches, desirably about 1½ to 2 ½ inches and preferably about 2 inches.

Figure 5:
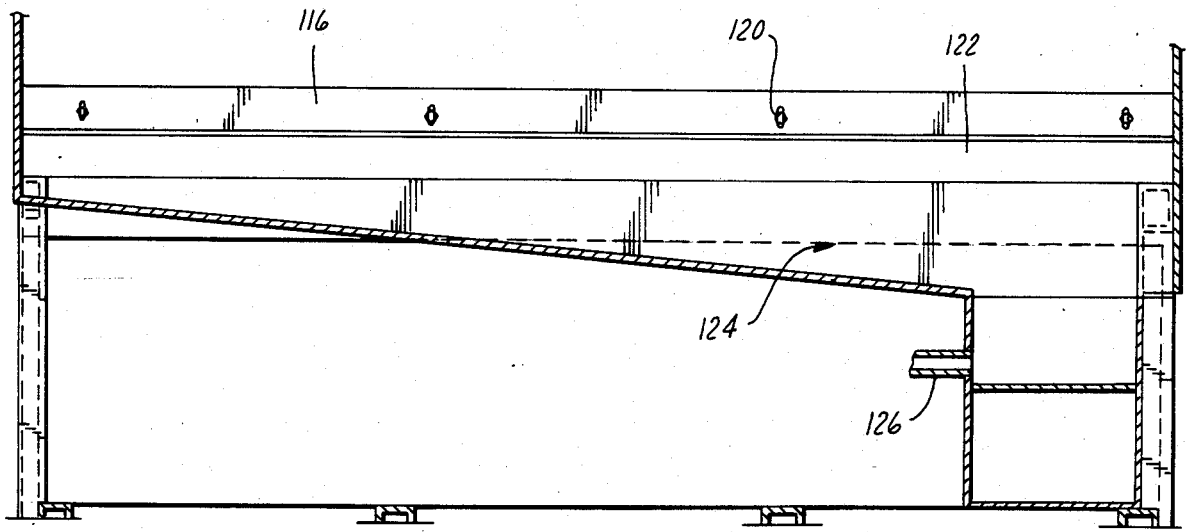
FIG. 5 is a fragmentary sectional view taken generally on line 5—5 of FIG. 2 and illustrating a portion of the lower chamber.

As shown in FIG. 2, in operation discharge of the mixture from the nozzle produces a depression 108 in the pool of water which has a maximum depth of about 5 to 7 inches below the surface of the pool when static or undisturbed. Usually, the depth of the undisturbed pool is about 12 to 14 inches. The pool of water is received in a pan extending the full length of the nozzle and formed by the cooperation of a bottom plate 110 and upstanding side walls 112 and 114. To permit adjustment of the depth of the pool of water, a dam plate 116 (FIG. 5) is secured to the wall 114 by bolts 118 received in elongate slots 120 in the plate. In operation, excess water flows over the dam plate, across an inclined bottom plate 122, into a sump 124 and through an outlet 126. The bottom plate 122 slopes downwardly toward the sump 124. After the water flows from the booth the particles of paint therein are preferably removed and, if desired, the clean water can be recirculated through the booth.

If the distance 128 between the top surface of the undisturbed pool of water and the discharge orifice 92 is more than about 15 inches, the removal of paint particles from the air stream is impaired. If this distance is less than about 6 inches, the static pressure at the exhaust fan, and hence the power required to produce the desired flow rates through the nozzle, increases significantly. Thus, this distance 128 is usually in the range of about 6 to 14 inches, desirably 8 to 12 inches, and preferably about 9 to 12 inches.

The exhaust fan system and the nozzle 46 are constructed and arranged such that the air stream flows through the lower portion of the rounded entry 74 with a velocity which is usually in the range of about 1,300 to 2,100 feet per minute (FPM), desirably about 1,400 to 2,000 FPM, and preferably about 1,600 to 1,800 FPM. The velocity through the restricted section is usually in the range of about 1,800 to 3,000 FPM, desirably about 2,000 to 2,800 FPM, and preferably 2,300 to 2,500 FPM. The velocity through the discharge orifice is usually in the range of about 4,500 to 7,500 FPM, desirably about 5,000 to 7,000 FPM, and preferably about 5,800 to 6,200 FPM. Preferably, the discharge nozzle is positioned in relation to the pool of water so that after the air stream impinges on the pool of water it passes between the pool and the discharge nozzle with a velocity which is usually in the range of about 2,000 to 3,200 FPM, desirably 2,200 to 3,000 FPM, and preferably about 2,500 to 2,700 FPM.

To remove moisture from the stream of air after it impinges on the water pool, a plurality of baffles 130, 132, 134 and 136 are disposed in the lower chamber downstream of the pool and in the flow of the air stream. The baffles 130 and 134 are metal plates fixed in the lower chamber. Preferably, the baffles 132 and 136 are adjustable.

In operation of the spray booth 10, the exhaust fan system is energized to move the stream of air 14 generally downwardly through the application chamber 16, nozzle 46, lower chamber 50 and its outlet 52. After the air stream passes through the booth, it can be exhausted to the atmosphere or recirculated to the booth. Water under pressure is supplied to the outlets 70 to fill the troughs 64 and flow over their edges and across substantially the entire surface of the bottom walls 60 and 62 of the application chamber. Water flows into the nozzle 46 in which it is atomized and mixed with the air stream and then discharged to impinge on the pool of water 48. Water from the pool flows over the dam plate 116 across substantially the entire surface of the plate 122 in the lower chamber, into the sump 124 and through the outlet 126.

When articles are sprayed with paint in the operating booth, some particles of paint are entrained in the air and some particles of paint are deposited on the stream of water flowing over the bottom walls. As the air stream enters the rounded inlet 74 of the nozzle 46, its velocity increases and it enters along with the water into the restricted section 80 of the nozzle. In the restricted section, the water is atomized into minute particles which are thoroughly mixed with and dispersed in the stream of air and are believed to produce a scrubbing or cleaning action which results in the particles of water and paint becoming attached to each other.

When the water flows through the rounded entry, it impinges on ledges 104 and 106 and is deflected generally transversely across and toward the center of the inlet of the restricted section 80 of the nozzle. This is believed to enhance atomization of the water into minute particles and dispersion of the water particles in the air stream and mixing of the water and paint particles in the restricted section which results in significantly improved cleaning of the air by removal of paint particles. It also results in suppressing or decreasing the noise produced by operation of the nozzle.

The mixture is discharged from the nozzle at a higher velocity through a restricted orifice 92 and impinges on the pool of water 48 below the nozzle to separate and remove the particles of paint from the air stream. The particles of paint become entrained in the water which flows from the pool, across the bottom of the lower chamber and out of the spray booth. Additional moisture, and it is believed paint particles entrained therein, is removed from the air stream by baffles disposed in the path of flow of the air stream downstream of the water pool. The cleaned and demoisturized air is exhausted from the lower chamber 50 through the outlets 52 via the exhaust ducts 54 by the exhaust fan system.

If desired or required to prevent pollution, the paint particles can be separated from the water after it flows out of the booth by suitable conventional methods and apparatus, such as filters, settling tanks and the like. If desired, after the paint has been removed, the resulting cleaned water can be circulated through the booth.

I claim:

1. Apparatus for removing particles of paint entrained in air from an application chamber of a paint spray booth comprising, a single elongated nozzle extending substantially the entire length of said application chamber, bottom walls extending lengthwise and crosswise of said application chamber and converging downwardly toward and merging into said nozzle, a lower chamber below said bottom walls and sealingly surrounding and communicating with said nozzle, an air outlet from said lower chamber constructed and arranged to exhaust air therefrom, air moving means to cause air with entrained paint particles from said application chamber to flow generally downwardly from said application chamber through said nozzle and into said lower chamber, a distributor associated with said bottom walls and constructed and arranged to cause water to flow over substantially the entire surface of said bottom walls and generally downwardly across said walls and into said nozzle to avoid adherence of paint particles to said walls, an open container in said lower chamber underlying said nozzle and constructed and arranged to provide a pool of water underlying said nozzle at least substantially throughout the length of said nozzle and spaced from and below an outlet of said nozzle, said nozzle having a pair of side walls with a generally curved portion extending substantially the entire length of said booth, being laterally spaced apart and constructed and arranged to provide an inlet through which air with entrained paint particles from said application chamber flows and said water from said bottom walls flows across said side walls over at least substantially the entire surface of said side walls to avoid adherence of paint particles thereto, a restriction in said nozzle below said rounded portion, extending at least substantially the entire length of said nozzle, and constructed and arranged to atomize the water into minute particles and disperse such water particles in the air so that the mixture thereof flows through the entire restriction at a higher speed than the speed of the air flowing through the inlet of said nozzle, said inlet merging into said restriction, a discharge orifice below said restriction and adjacent the outlet of said nozzle, extending at least substantially the entire length of said nozzle, and constructed and arranged to discharge the mixture with a speed substantially greater than the speed of the mixture in the restriction so that the mixture impinges on the pool of water in said container, said discharge orifice and said container being constructed and arranged such that said orifice is spaced apart about 6 to 15 inches from the upper surface of the pool of water in the container when static with no discharge from said orifice and the mixture when discharged from said orifice produces a depression in the pool of water having a maximum depth which is substantial and not more than about 7 inches below the upper surface of the pool of water when static, said restriction merging into said discharge orifice, and said nozzle and said air moving means being constructed, arranged and sized such that when operating air with entrained paint particles flows through the lower portion of said inlet with a velocity of at least about 1300 feet per minute, flows through the lower portion of said restriction with a velocity of at least about 1,800 feet per minute and flows through said discharge orifice with a velocity in the range of about 4,500 to 7,500 feet per minute, whereby particles of paint are deposited in the pool of water and removed from the air.

2. The apparatus for claim 1 wherein said nozzle also comprises ledge wall portions disposed between said inlet and said restriction, projecting generally tranversely to the side walls of said restriction, and constructed and arranged to deflect water flowing over said inlet side wall portions generally across the inlet of said restriction and into the stream of air flowing into said inlet, whereby atomization of the water and dispersion of the water particles in the air is enhanced.

3. The apparatus of claim 1 wherein said discharge orifice of said nozzle is constructed and arranged to discharge the mixture of air and water particles with a velocity of about 5,000 to 7,000 feet per minute.

4. The apparatus of claim 1 wherein said discharge orifice of said nozzle is constructed and arranged to discharge the mixture of air and water particles with a velocity of about 5,800 to 6,200 feet per minute.

5. The apparatus of claim 1 wherein said restriction of said nozzle is constructed and arranged to produce a velocity of the mixture of air and water particles therein in the range of about 1,800 to 3,000 feet per minute.

6. The apparatus of claim 1 wherein said inlet of said nozzle is constructed and arranged to produce a velocity of the air mixture in the lower portion of said inlet in the range of about 1,300 to 2,100 feet per minute.

7. The apparatus of claim 1 wherein said container is constructed, arranged and positioned with respect to said discharge orifice such that after the mixture impinges on the pool of water in the container, the air passes between the container and the nozzle with a velocity of at least 2,000 feet per minute.

8. The apparatus of claim 1 wherein said restriction of said nozzle has a depth of at least nine inches.

9. The apparatus of claim 1 wherein said restriction of said nozzle has a depth in the range of about 11 to 24 inches.

10. The apparatus of claim 1 wherein said container is constructed and arranged so that it provides a pool of water having a depth of at least eight inches when static.

11. The apparatus of claim 1 wherein said container is constructed and arranged so that it provides a pool of water having a depth of at least eight inches when static, and the upper surface of the pool of water when static is spaced about eight to twelve inches below said discharge orifice of said nozzle.

12. The apparatus of claim 1 wherein said container is constructed and arranged so that it provides a pool of water having a depth in the range of about 8 inches to 15 inches when static, and the upper surface of the pool of water when static is spaced in the range of about 8 inches to 14 inches below said discharge orifice of said nozzle.

13. The apparatus of claim 1 wherein said container is constructed and arranged so that it provides a pool of water having a depth of at least eight inches when static, and the upper surface of the pool of water when static is spaced in the range of about 9 inches to 12 inches below said discharge orifice of said nozzle.

14. The apparatus of claim 1 wherein said container is constructed and arranged such that when the apparatus is operating water in the pool will flow over an edge of the container and into said lower chamber.

15. The apparatus of claim 1 which also comprises a baffle disposed in said lower chamber downstream from said container and in the flow of air through the said lower chamber and constructed and arranged to remove moisture from the air flowing through said lower chamber.

16. The apparatus of claim 1 wherein each of said bottom walls is inclined downwardly at an acute included angle to a horizontal reference in the range of about 1° to 5°.

17. The apparatus of claim 1 wherein said distributor is constructed and arranged to provide for each bottom wall a flow rate of water of at least 25 gallons per minute per lineal foot of length of said nozzle.

18. The apparatus of claim 1 wherein said curved portions of said side walls of said inlet of said nozzle are constructed and arranged with a large enough radius to maintain the flow of water in contact with at least substantially all of the surface thereof.

19. The apparatus of claim 1 wherein said nozzle is open and unrestricted throughout at least substantially the entire length thereof.

20. The apparatus of claim 1 wherein said discharge orifice of said nozzle is constructed and arranged to have when in operation a static pressure of at least 5 inches of water.

* * * * *